(No Model.)
F. H. CROSS.
MECHANISM FOR CONVERTING MOTION.
No. 281,347. Patented July 17, 1883.
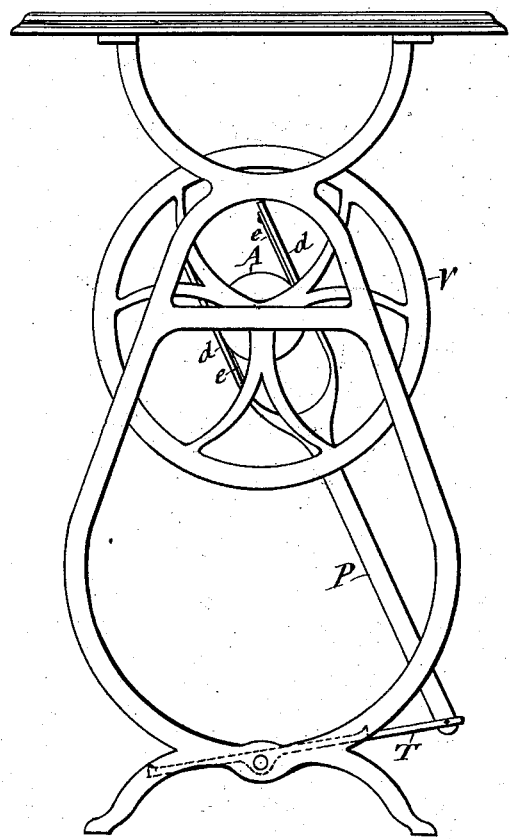
Fig. I
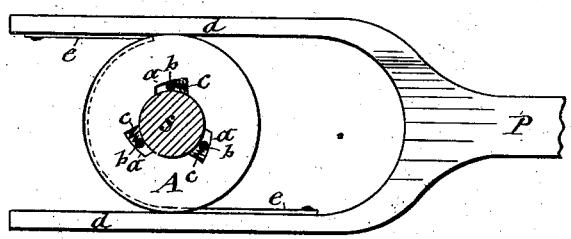
Fig. II
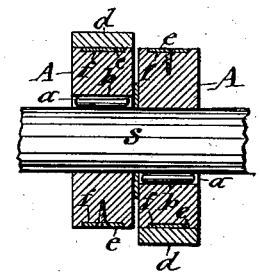
Fig. III
WITNESSES:
C. Bendixon
Wm. E. Raymond
INVENTOR:
Freeman H. Cross
per Duell, Laass & Hey
his attys

UNITED STATES PATENT OFFICE.

FREEMAN H. CROSS, OF PULASKI, ASSIGNOR OF ONE-HALF TO RUFUS D. GARDNER, OF ADAMS, NEW YORK.

MECHANISM FOR CONVERTING MOTION.

SPECIFICATION forming part of Letters Patent No. 281,347, dated July 17, 1883.

Application filed March 31, 1883. (No model.)

*To all whom it may concern:*

Be it known that I, FREEMAN H. CROSS, of Pulaski, in the county of Oswego, in the State of New York, have invented new and useful Improvements in Mechanism for Converting Reciprocating into Rotary Motion, of which the following, taken in connection with the accompanying drawings, is a full, clear, and exact description.

This invention relates to improved means for transmitting motion to sewing-machines; and it consists, essentially, in the combination of two pulleys or pinions mounted loosely on a rotary shaft or wheel-hub and adapted to alternately engage and release the same by the alternate reverse motion of the pulleys or pinions, a reciprocating rod or pitman provided with parallel prolonged bearings respectively on opposite sides of the peripheries of the pulleys or pinions, and a coil-spring fixed at one end to the periphery of the pulley and at the opposite end to the pitman, for transmitting motion from said pitman to the pulleys, all as hereinafter more fully described, and specifically set forth in the claim, said devices imparting to the shaft a continuous and positive rotation in one direction and entirely avoiding dead-centers on the shaft, and also jars in the motion of the same.

The invention is fully illustrated in the annexed drawings, wherein Figure 1 is a side view of a sewing-machine table provided with my improved means for transmitting motion from the treadle to the driving-wheel. Figs. 2 and 3 are enlarged transverse sections of the devices for converting the reciprocating motion into rotary motion, taken, respectively, parallel to the plane of the pulley and on the line of the axes thereof.

Similar letters of reference indicate corresponding parts.

W represents the driving-wheel or balance-wheel of a sewing-machine, and T is the treadle which by a pitman, P, transmits motion to the aforesaid driving-wheel, usually by a connection of said pitman with a crank or wrist pin on said wheel. This connection of the aforesaid parts subjects the operation of the machine to the difficult starting and unequal motion of the driving-shaft incident to the dead-centers to be overcome by the pitman. It is to overcome these defects in a simple, positive, and convenient manner which my invention has for its object; and to that end I employ the following instrumentalities: Either on a suitable hub of the driving-wheel W or on a shaft, *s*, fixed thereto, I mount loosely two pulleys, A A, so as to allow them to rotate on said shaft. The interior or axial bearing of the pulleys I provide with cam-grooves *a a*, in the form of recesses, extending a short distance around the periphery of the axial bearing, and being at one end shallower than at the opposite end. In each of the grooves *a a* is placed a roller, *b*, which is of such a diameter as to bind on the shaft when the said roller is in the shallow end of the groove *a*, and become liberated therefrom when in the deeper end of said groove. A spiral spring, *c*, interposed between the roller *b* and the deep end of the groove *a*, serves to throw the said roller toward the opposite end of the groove, and thus into frictional contact with the axle. The periphery of the pulley A, I provide with a circumferential groove, *f*, in which lies a flat spring-band, *e*, which is at one end connected to the periphery of the pulley and coiled around the same, and has its opposite end attached to the pitman P in the following manner: The pitman is bifurcated or slotted longitudinally to form two prolonged rectilinear and parallel bearings, *d d*, which rest against the peripheries of the two pulleys, respectively, on diametrically-opposite sides thereof, so that the pitman has a bearing on each of said pulleys. The coil-spring bands *e e* of the pulleys are wound in opposite directions, and extended to and connected with their respective pitman-bearings, respectively, at opposite sides thereof.

In the operation of the described devices the reciprocating pitman P draws out the band *e* of one pulley, and thereby transmits motive power to said pulley. Simultaneously with this action the band *e* of the other pulley is allowed to wind itself upon its respective pulley by the recoil of said band, and thereby imparts a reverse motion to said pulley, the action of the two pulleys being reversed at the return motion of the pitman. In the rotation of the pulley which receives the motive power the springs c throw the roller b b into frictional contact with the shaft and causes said roller to become bound sufficiently to compel the shaft to rotate with the pulley. The return motion of the pitman relieves the band from the draft and allows the same to recoil and thereby reverse the motion of the pulley, which latter motion immediately relieves the rollers b from their frictional hold on the shaft and allows said shaft to continue its rotation in one direction, said continuation being effected by the band e of the other pulley being drawn out synchronously with the aforesaid return motion of the pitman.

It will be observed that by my improved mechanism for converting motion the reciprocating pitman receives a support on the pulleys, and is thus guided and steadied in its movement, and the bands e e, when drawn off from the pulley, lie perfectly straight and parallel with the pitman, thus avoiding slack of said band and the lost motion incident thereto.

Having described my invention, what I claim as new, and desire to secure by Letters Patent, is—

In combination with a rotary shaft and a pulley or pulleys mounted loosely on said shaft and adapted to alternately engage and release the same by the alternate reverse motion of the pulley, a pitman having prolonged parallel bearings on diametrically-opposite sides of the periphery of the pulley, and a coil-spring fixed at one end to the periphery of the pulley and at the opposite end to the pitman, substantially as and for the purpose set forth.

In testimony whereof I have hereunto signed my name and affixed my seal, in the presence of two attesting witnesses, at Syracuse, in the county of Onondaga, in the State of New York, this 28th day of March, 1883.

FREEMAN H. CROSS. [L. S.]

Witnesses:
 C. H. DUELL,
 WM. C. RAYMOND.